United States Patent [19]

Blaylock

[11] 4,213,522

[45] Jul. 22, 1980

[54] CLUTCH THROW-OUT BEARING PLATE

[76] Inventor: Tommey J. Blaylock, 2448 NW. 3, Oklahoma City, Okla. 73107

[21] Appl. No.: 870,158

[22] Filed: Jan. 17, 1978

Related U.S. Application Data

[63] Continuation-in-part of Ser. No. 799,448, May 23, 1977, Pat. No. 4,114,744.

[51] Int. Cl.² ............................................. F16D 23/14
[52] U.S. Cl. .................................... 192/98; 192/99 A; 192/110 B; 192/111 R
[58] Field of Search ................... 192/98, 99 A, 110 B, 192/111 R, 70.25, 70.27; 308/233

[56] References Cited

U.S. PATENT DOCUMENTS

| | | | |
|---|---|---|---|
| 1,330,965 | 2/1920 | White | 192/70.25 |
| 1,684,471 | 9/1928 | Carhart | 192/110 B |
| 1,825,980 | 10/1931 | Reed | 192/110 B |
| 1,935,581 | 11/1933 | Snow, Jr. | 192/111 R |
| 2,094,247 | 9/1937 | Vail | 192/111 R |
| 2,863,537 | 12/1958 | Root | 192/98 |
| 2,995,406 | 8/1961 | Pitner | 192/98 |
| 3,868,006 | 2/1975 | Linn et al. | 192/98 |
| 4,034,836 | 7/1977 | Sink et al. | 192/99 A |

*Primary Examiner*—Allan D. Herrmann
*Attorney, Agent, or Firm*—Robert K. Rhea

[57] ABSTRACT

In a vehicle clutch construction, a flat plate ring is interposed between the clutch throw-out bearing and clutch release fingers and maintained concentric with the throw-out bearing by a flexible connection with the clutch release fingers.

1 Claim, 7 Drawing Figures

U.S. Patent  Jul. 22, 1980  4,213,522
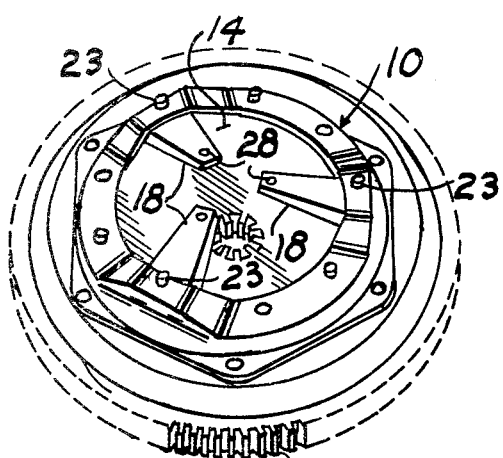
FIG.1
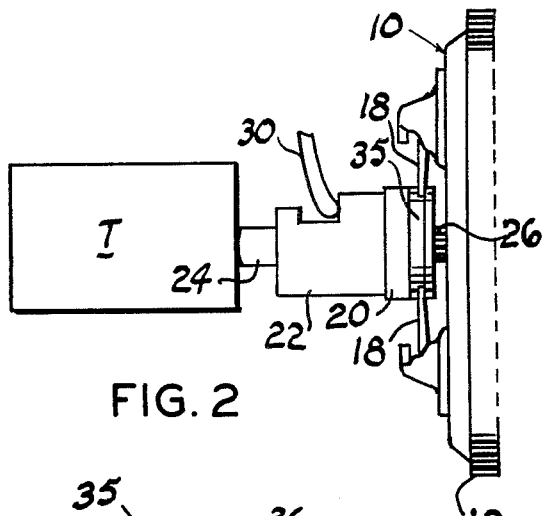
FIG.2
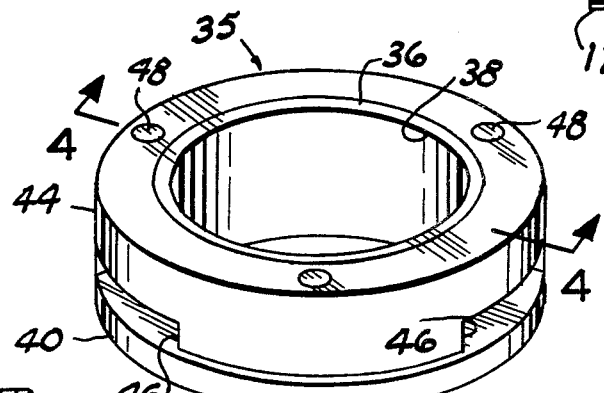
FIG.3
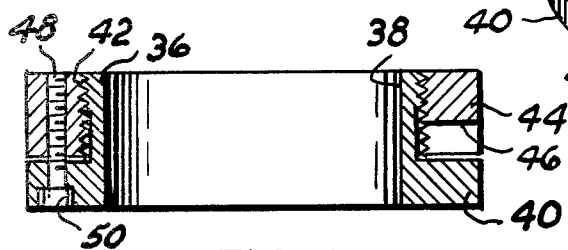
FIG.4
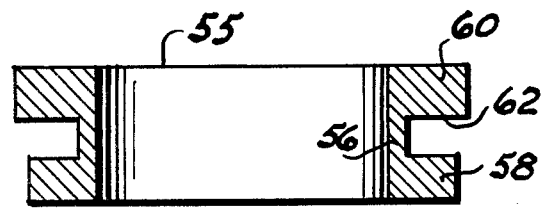
FIG.5
FIG.6
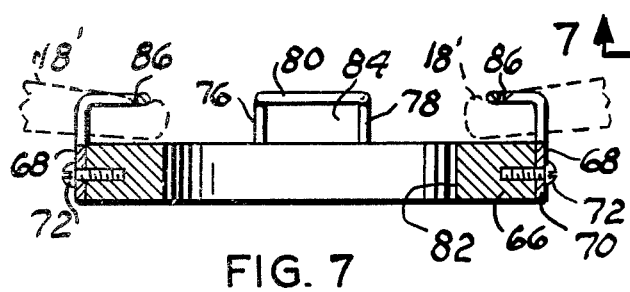
FIG.7
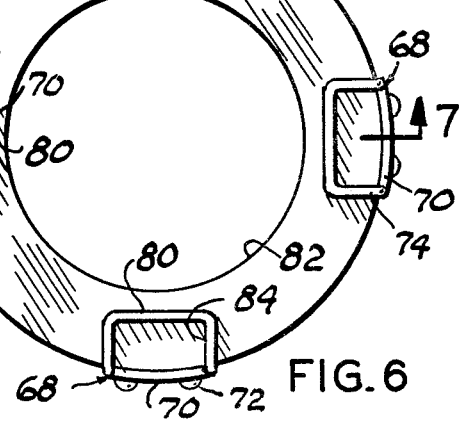

4,213,522

CLUTCH THROW-OUT BEARING PLATE

CROSS REFERENCE TO RELATED APPLICATION

This application is a continuation-in-part of an application filed by me in the United States Patent and Trademark Office on May 23, 1977, Ser. No. 799,448, entitled CLUTCH THROW-OUT BEARING PLATE, now U.S. Pat. No. 4,114,744,

BACKGROUND OF THE INVENTION

1. Field of the Invention

The present invention relates to vehicle clutches and more particularly to a pressure plate to be installed between the throw-out bearing and clutch release fingers.

In a vehicle clutch construction, a clutch throw-out bearing surrounds the transmission input shaft and is moved axially along this shaft by the clutch pedal for engaging the clutch release fingers to separate the clutch pressure plate from the stationary clutch disk secured to the adjacent face of the flywheel thus disengaging the clutch for shifting transmission gears. Contact between the throw-out bearing and the clutch release fingers results in a three-point frictional wearing-out action of the throw-out bearing necessitating its replacement. This is a time consuming and relatively expensive repair in that the gear train, including the transmission of the vehicle, must be disconnected from the clutch in order to remove the old throw-out bearing and install a new one.

2. Description of the Prior Art

Prior patents, such as U.S. Pat. Nos. 3,333,664 and 3,486,598 generally relate to construction of the throw-out bearing rather than a friction or pressure plate to be interposed between the throw-out bearing and the clutch release fingers for minimizing wear of the throw-out bearing.

U.S. Pat. No. 1,886,294 discloses a clutch throw-out bearing connecting collar which includes clutch release levers pivotally pinned, at one end, thereto with the opposite end of the levers being mounted between clutch plates for rocking movement in both axial and lateral directions.

U.S. Pat. No. 3,211,265 discloses a lever release plate connected with clutch release fingers by bolts inserted through the inwardly disposed ends of clutch release levers and slidable in radial slots formed in the lever release plate.

This invention is distinctive over these two patents by providing a throw-out bearing pressure plate to be interposed between the clutch release levers and a throw-out bearing on substantially any conventional vehicle friction clutch without the necessity of replacing or modifying the clutch release levers.

This invention is distinctive over my copending application by forming recesses in the periphery of a clutch throw-out bearing pressure plate for receiving the clutch release fingers.

SUMMARY OF THE INVENTION

In the preferred embodiment a generally cylindrical bearing plate is interposed between the clutch throw-out bearing and one face of the clutch release fingers of a vehicle clutch concentric with the transmission input shaft. Radial slots open through the periphery of the bearing plate receive adjacent end portions of the clutch release fingers which permits movement of the clutch release fingers in a radial direction relative to the bearing plate as the clutch is engaged and released.

In another embodiment the bearing plate is characterized by an annular groove in its periphery for receiving the adjacent end portions of the clutch release fingers.

In a further embodiment a plurality of radially spaced wirelike loops are secured to the periphery and project inwardly at one end of the bearing plate for receiving the adjacent end portions of a like plurality of clutch release fingers.

The principal object of this invention is to provide a friction bearing plate to be interposed between the clutch throw-out bearing and clutch release fingers to minimize wear on the clutch throw-out bearing and increase its useful life.

Brief Description of the Drawings

FIG. 1 is a perspective view of a vehicle clutch connected with a flywheel illustrating the relative position of the clutch release fingers which frictionally engage one face of a clutch throw-out bearing;

FIG. 2 is a side elevational view of a vehicle clutch connected with a transmission through an input shaft having a throw-out bearing thereon with parts of the clutch broken away for clarity and illustrating the clutch throw-out bearing pressure plate in clutch released position;

FIG. 3 is a perspective view of one embodiment of the throw-out bearing pressure plate;

FIG. 4 is a vertical cross sectional view taken substantially along the line 4—4 of FIG. 3;

FIG. 5 is a vertical cross sectional view illustrating another embodiment of the bearing plate;

FIG. 6 is an end elevational view of another embodiment of the bearing plate; and, FIG. 7 is a vertical cross sectional view taken substantially along the line 7—7 of FIG. 6 and illustrating the relative position of two clutch release fingers connected therewith.

DESCRIPTION OF THE PREFERRED EMBODIMENTS

Like characters of reference designate like parts in those figures of the drawings in which they occur.

In the drawings:

The reference numeral 10 indicates a conventional vehicle clutch secured to one face of a flywheel 12. The clutch 10 includes a pressure plate 14 normally urged into frictional engagement with a clutch disk by a plurality of springs, neither being shown, contained by the clutch. The clutch pressure plate 14 is axially moved away from the clutch disk to release the clutch by three clutch release levers or fingers 18 having their free end portions normally spring biased axially away from the clutch toward a clutch throw-out bearing 20 supported by a throw-out bearing support 22. The clutch pressure plate 14 is adjusted relative to the clutch disk by a like plurality of bolts 23, one for each clutch finger. The clutch throw-out bearing 20 and its support 22 coaxially surrounds a transmission input shaft 24 extending between the vehicle transmission T and the clutch 10 with its splined forward end portion 26 cooperatively surrounded by the clutch pressure plate 14. The free end portion of the three clutch release fingers 18 are usually provided with a like plurality of stud bolts, not shown, received by threaded holes 28 for frictional contact with the adjacent face of the throw-out bearing 20 when a clutch pedal operated yoke or lever 30 moves the throw-out bearing 20 toward the clutch. Frictional contact of the clutch throw-out bearing, with the clutch release finger supported stud bolts rotating with the clutch, results in undue wear on the adjacent face of the clutch throw-out bearing.

The above description is conventional with several truck vehicle clutches and throw-out bearings and is set forth to show the structure with which the present invention is intended to be used.

Referring more particularly to FIGS. 3 and 4, the numeral 35 indicates a preferred embodiment of the bearing plate. The bearing plate 35 is formed by a sleeve 36 having a bore 38 dimensioned to loosely surround the transmission shaft 24. One end of the sleeve is provided with an outstanding annular flange 40 diametrically at least equal with respect to the diameter of the bearing 20 and its other end portion is externally threaded, as at 42. The bearing plate further includes a cylindrical ring 44 having a thickness slightly less than the length of the sleeve projecting beyond the flange 40 and having an outside diameter substantially equal with respect to the outside diameter of the flange 40 and a threaded bore for engagement with the sleeve threads 42. A plurality of equally spaced radially disposed recesses 46, one for each of the clutch fingers 18, only two being shown, are formed in the end surface of the ring 44 adjacent the flange 40 for respectively receiving the inwardly projecting end portion of the clutch fingers 18, as presently explained.

Obviously, four such recesses 46 may be formed in the ring 40 when the bearing plate 35 is employed with a vehicle clutch having four clutch fingers, not shown. The flange 40 and ring 44 are line drilled and threaded between the positions of the recesses 46 for receiving stud bolts 48, or the like, to prevent friction induced rotation of the ring 44 or flange 40 relative to the other. The heads 50 of the bolts 48 are preferably countersunk in the flange 40 so that the assembled bearing plate 35 presents parallel opposing end surfaces.

Referring also to FIG. 5, the numeral 55 indicates another embodiment of the bearing plate which is unitary in construction comprising a sleeve portion 56 having annular outstanding flanges 58 and 60 at its respective end portions defining an annular groove 62 intermediate the length of the sleeve 56 for receiving adjacent end portions of the clutch release fingers 18.

Referring more particularly to FIGS. 6 and 7, the numeral 65 indicates another embodiment of the bearing plate comprising a cylindrical ring 66 having parallel end faces for similarly surrounding the transmission shaft 24. The bearing plate 65 is illustrated for use with vehicle clutches equipped with four equally spaced clutch release fingers. A plurality, four in the example shown, of clip members 68 are secured to the periphery of the bearing plate 65 in circumferentially equally spaced relation. Each of the clips 68 comprise a plate portion 70 flatly secured to a circumferential portion of the perimeter of the ring 66 by screws 72, or the like. The clips 68 are characterized by a U-shaped spring steel wire member 74 having its legs 76 and 78 connected with the respective ends of the plate 70 in the cylindrical plane of the plate 65 and turned inwardly at right angle toward the plate axis intermediate their ends to lie in a common plane in spaced parallel relation with respect to the adjacent end surface of the ring 66 and dispose the bight portion 80 of each clip adjacent the cylindrical plane generated by the bore 82 of the ring. The purpose of the clips 68 is to form a socketlike recess 84 for nesting the adjacent end portion of the respective clutch finger 18'. The clutch fingers 18' are each provided with a transverse recess 86 which nests a peripheral portion of the respective clip bight portion 80 thus maintaining the bearing plate 65 substantially concentric with respect to the transmission shaft 24 while permitting pivoting movement of the clutch fingers 18' toward and away from the clutch pressure plate 14.

Operation

On existing vehicles the bearing plate 35 is installed by disconnecting the transmission gear train from the vehicle to permit installation of a new throw-out bearing 20 and interposing the bearing plate 35 between the new bearing 20 and the clutch 10.

With the components of the bearing plate assembled as shown in FIG. 3, the clutch release fingers are expanded outwardly by loosening the bolts 23 until the bearing plate 35 may be positioned therebetween with the respective recesses 46 disposed for receiving the inwardly projecting end portion of the respective clutch finger 18. The clutch bolts 23 are then progressively tightened until the bearing plate 35 is supported by the clutch finger end portions within the respective recess 46 when the clutch fingers and bearing plate are in substantially the position shown by FIG. 2. The bearing plates 55 and 65 may be installed in a similar manner.

Alternatively, the bearing plate 35 may be installed by removing the stud bolts 48 and positioning the flange 40 and ring 44 on respective opposing surfaces of the inwardly projecting end portions of the clutch fingers 18 with the respective clutch finger end portion disposed within the respective ring recess 46. The bearing plate stud bolts 48 are then inserted and tightened.

Obviously the invention is susceptible to changes or alterations without defeating its practicability. Therefore, I do not wish to be confined to the preferred embodiment shown in the drawings and described herein.

I claim:

1. In a vehicle clutch assembly having a flywheel and a clutch pressure plate movable toward and away from the flywheel by a plurality of radially inwardly projecting clutch release fingers, a transmission input shaft connecting the clutch pressure plate with a transmission and having a clutch throw-out bearing coaxially mounted on the shaft and movable toward and away from the inwardly directed end portions of said clutch release fingers, the improvement comprising:

a generally cylindrical centrally bored bearing plate supported by said clutch release fingers and comprising a sleeve having an outstanding flange at one end diametrically substantially equal with the diameter of said throw-out bearing and having external threads adjacent its other end loosely surrounding said transmission input shaft and interposed between said throw-out bearing and said clutch pressure plate with the flange contacting the end portion surface of said clutch release fingers opposite said throw-out bearing;

a ring diametrically equal with said flange threadedly engaged with said sleeve, said ring having a plurality of equally spaced radially disposed recesses formed in its surface facing said flange forming, in combination with said sleeve and said flange, a like plurality of radially open sockets nesting the adjacent end portion of the respective said clutch release finger; and, at lease one bolt extending through said ring and said flange for preventing angular rotation of said ring relative to said sleeve.

* * * * *